(12) United States Patent
Park et al.

(10) Patent No.: US 10,738,153 B2
(45) Date of Patent: Aug. 11, 2020

(54) RING-OPENING POLYMERIZATIONS USING A FLOW REACTOR

(71) Applicants: International Business Machines Corporation, Armonk, NY (US); The Board of Trustees of the Leland Stanford Junior University, Stanford, CA (US)

(72) Inventors: Nathaniel H. Park, San Jose, CA (US); James L. Hedrick, Pleasanton, CA (US); Victoria A. Piunova, Los Gatos, CA (US); Dmitry Zubarev, San Jose, CA (US); Gavin O. Jones, San Jose, CA (US); Robert M. Waymouth, Palo Alto, CA (US); Binhong Lin, Stanford, CA (US)

(73) Assignees: INTERNATIONAL BUSINESS MACHINES CORPORATION, Armonk, NY (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 79 days.

(21) Appl. No.: 16/029,025

(22) Filed: Jul. 6, 2018

(65) Prior Publication Data
US 2020/0010613 A1    Jan. 9, 2020

(51) Int. Cl.
*C08G 64/00* (2006.01)
*C08G 64/08* (2006.01)

(52) U.S. Cl.
CPC .................... *C08G 64/085* (2013.01)

(58) Field of Classification Search
CPC .. C08G 64/42; C08G 64/023; C08G 64/0233; C08F 8/34; C08F 12/21
See application file for complete search history.

(56) References Cited

U.S. PATENT DOCUMENTS

| 3,320,335 A | 5/1967 | Hedrick et al. |
| 3,558,568 A | 1/1971 | Kobayashi, et al. |

(Continued)

FOREIGN PATENT DOCUMENTS

| JP | S63-287948 A | 11/1988 |
| WO | 9428054 A1 | 12/1994 |

(Continued)

OTHER PUBLICATIONS

Chan, Chemical Science, vol. 5 p. 3294-3300 (2014) (Year: 2014).*

(Continued)

*Primary Examiner* — Robert C Boyle
(74) *Attorney, Agent, or Firm* — Amin, Turocy & Watson, LLP

(57) ABSTRACT

Techniques regarding the synthesis of one or more polymers through one or more ring-opening polymerizations conducted within a flow reactor and facilitated by one or more anionic catalysts are provided. For example, one or more embodiments can comprise a method, which can comprise functionalizing, via a post-polymerization reaction within a flow reactor, a chemical compound by covalently bonding a trimethylsilyl protected thiol to a pendent functional group of the chemical compound in a presence of a catalyst. The pendent functional group can comprise a perfluoroaryl group and a methylene group.

25 Claims, 13 Drawing Sheets

(56) References Cited

U.S. PATENT DOCUMENTS

| | | | |
|---|---|---|---|
| 8,044,194 | B2 | 10/2011 | Dubois et al. |
| 8,236,902 | B2 | 8/2012 | Hogen-Esch et al. |
| 8,440,176 | B2 | 5/2013 | Laronde et al. |
| 8,829,128 | B2 | 9/2014 | Huhtanen et al. |
| 9,006,337 | B2 | 4/2015 | Zhong et al. |
| 9,108,172 | B2 | 8/2015 | Mattmann et al. |
| 9,389,183 | B2 | 7/2016 | Chen et al. |
| 2010/0228060 | A1 | 9/2010 | Langstrom et al. |
| 2010/0305281 | A1* | 12/2010 | Fujiwara ............ C07D 319/06 525/461 |
| 2011/0207887 | A1 | 8/2011 | Duc et al. |
| 2012/0062228 | A1 | 3/2012 | Williamson et al. |
| 2013/0079465 | A1 | 3/2013 | Desbois et al. |
| 2013/0102728 | A1 | 4/2013 | Yang et al. |
| 2016/0289399 | A1 | 10/2016 | Underwood et al. |
| 2017/0240668 | A1 | 8/2017 | Coatex |
| 2019/0177466 | A1* | 6/2019 | Hedrick ............ C08G 18/3812 |

FOREIGN PATENT DOCUMENTS

| | | |
|---|---|---|
| WO | 2009009251 A1 | 1/2009 |
| WO | 2016049123 A1 | 3/2016 |
| WO | 2016200956 A1 | 12/2016 |

OTHER PUBLICATIONS

Park, Nature Communications, vol. 8, Issue 1, Dec. 2017, p. 1-7 (Year: 2017).*

List of IBM Patents or Applications Treated as Related. Jul. 11, 2018.

Hu, Xin, et al. "Continuous Flow Ring-Opening Polymerizations." Reaction Chemistry & Engineering 2.1 (2017): 20-26. Reaction Chemistry & Engineering (RSC Publishing). 18 pages.

Lin, Binhong, et al. "Organic Ring-Opening Polymerization Catalysts: Reactivity Control by Balancing Acidity." Macromolecules, 2018, 51 (8), pp. 2932-2938. 7 pages.

Lin, Binhong, et al. "Urea Anions: Simple, Fast, and Selective Catalysts for Ring-Opening Polymerizations." J. Am. Chem. Soc., 2017, 139 (4), pp. 1645-1652. 8 pages.

Van Den Berg, Sebastiaan, et al. "Clickable Polylactic Acids by Fast Organocatalytic Ring-Opening Polymerization in Continuous Flow." Macromolecules, 2016. 9 pages.

Melker, Anna, et al. "Continuous Flow Synthesis of Poly(Methyl Methacrylate) via a Light-Mediated Controlled Radical Polymerization." Journal of Polymer Science Polymer Chemistry. 2015, 53, 2693-2698. 6 pages.

Gutmann, Bernhard, et al. "Continuous-Flow Technology—A Tool for the Safe Manufacturing of Active Pharmaceutical Ingredients." Angew. Chem. Int. Ed. 2015, 54, 6688-6728. 41 pages.

Britton, Joshua, et al. "Multi-Step Continuous-Flow Synthesis." Chem. Soc. Rev. 2017, 46, 1250-1271. 22 pages.

Zhang, Xiangyi, et al. "Fast and selective ring-opening polymerizations by alkoxides and thioureas". Nat. Chem. 2016, 8, 1047-1053. 7 pages.

Kamber, Nahrain, et al. "Organocatalytic Ring-Opening Polymerization." Chem. Rev. 2007, 107, 5813-5840. 28 pages.

Zhu, Ning, et al. "Enzymatic Continuous Flow Synthesis of Thiol-Terminated Poly($\square$-Valerolactone) and Block Copolymers." Macromolecular Rapid Communications 2018. 6 pages.

Zhu, Ning, et al. "Sn(OTf)2 Catalyzed Continuous Flow Ring-Opening Polymerization of ε-Caprolactone." RSC Advances, 2015, 5, 31554-31557. 4 pages.

Zhu, Ning, et al. "Continuous Flow Protecting-Group-Free Synthetic Approach to Thiol-Terminated Poly(ε-Caprolactone)." European Polymer Journal 2016, 80, 234-239. 6 pages.

Kundu Santanu, et al. "Continuous Flow Enzyme-Catalyzed Polymerization in a Microreactor." Journal of the American Chemical Society. 2011, 133, 6006-6011. 13 pages.

Reis, Marcus H., et al. "Continuous-Flow Chemistry for the Determination of Comonomer Reactivity Ratios." Polymer Chemistry. Jan. 2018. 7 pages.

Abe, Akihiro, et al. "Controlled Polymerization and Polymeric Structures: Flow Microreactor Polymerization, Micelles Kinetics, Polypeptide Ordering, Light Emitting Nanostructures." Advances in Polymer Science 259. 2013. 253 pages.

Leibfarth, Frank A., et al. "Scalable Synthesis of Sequence-Defined, Unimolecular Macromolecules by Flow-IEG." PNAS 2015, 201508599. 6 pages.

Zhu, Ning, et al. "Organocatalyzed Continuous Flow Ring-Opening Polymerizations to Homo- and Block-Polylactones." Polymer 2016, 84, 391-397. 7 pages.

Porta, Riccardo, et al. "Flow Chemistry: Recent Developments in the Synthesis of Pharmaceutical Products." Organic. Process Research & Development Nov. 2015. 67 pages.

Chen, Mao, et al. "Improving Photo-Controlled Living Radical Polymerization from Trithiocarbonates through the Use of Continuous-Flow Techniques." Chem. Commun. 2015, 51, 6742-6745. 6 pages.

Micic, Nenad, et al. "Scale-up of the Reversible Addition-Fragmentation Chain Transfer (RAFT) Polymerization Using Continuous Flow Processing." Processes 2014, 2, 58-70. 13 pages.

Peng, J., et al. "The in Situ Formation of Nanoparticles via RAFT Polymerization-Induced Self-Assembly in a Continuous Tubular Reactor." Polymer Chemistry 2017, 8, 1495-1506. 14 pages.

Deihl, Christina, et al. "Accelerated Continuous Flow RAFT Polymerization." Macromolecules 2010, 43, 10311-10314. 4 pages.

Ramsey, Bonnie, L., et al. "Photoinduced Organocatalyzed Atom Transfer Radical Polymerization Using Continuous Flow." Macromolecules 2017, 50, 2668-2674. 7 pages.

Parida, Dambarudhar, et al. "Coil Flow Inversion as a Route to Control Polymerization in Microreactors." Macromolecules 2014, 47, 3282-3287. 6 pages.

Morsbach, Jan, et al. "Living Polymer Chains with Predictable Molecular Weight and Dispersity via Carbanionic Polymerization in Continuous Flow: Mixing Rate as a Key Parameter." Macromolecules 2016, 49, 5043-5050. 8 pages.

Mastan, Erlita, et al. "Continuous Production of Multiblock Copolymers in a Loop Reactor: When Living Polymerization Meets Flow Chemistry." Macromolecules 2017. 15 pages.

Natalello, Adrian, et al. "Living Anionic Polymerization in Continuous Flow: Facilitated Synthesis of High-Molecular Weight Poly(2-Vinylpyridine) and Polystyrene." Organic Process Research & Development. Jul. 2014. 7 pages.

Nagaki, Aiichiro "Microflow-System-Controlled Anionic Polymerization of Styrenes." Macromolecules 2008, 41, 6322-6330. 9 pages.

Tonhauser, Christoph, et al. "Microflow Technology in Polymer Synthesis." Macromolecules 2012, 45, 9551-9570. 20 pages.

Mascia, Salvatore, et al. "End-to-End Continuous Manufacturing of Pharmaceuticals: Integrated Synthesis, Purification, and Final Dosage Formation." Angew. Chem. Int. Ed. 2013, 52, 12359-12363. 6 pages.

Adamo, Andrea, et al. "On-Demand Continuous-Flow Production of Pharmaceuticals in a Compact, Reconfigurable System." Science 2016, 352, 61-67. 8 pages.

Lee, Ashlynn, L. Z., et al. "Injectable biodegradable hydrogels from vitamin D-functionalized polycarbonates for the delivery of avastin with enhanced therapeutic efficiency against metastatic colorectal cancer." Biomacromolecules 16, 465-75 (2015). 11 pages.

Nederberg, Fredrik, et al. "Biodegradable nanostructures with selective lysis of microbial membranes." Nature Chemistry, 409-14, Apr. 3, 2011. 6 pages.

Ono, Robert J., et al. "Benzyl chloride-functionalized polycarbonates: a versatile platform for the synthesis of functional biodegradable polycarbonates." Macromolecules 47, 7725-7731 (2014).

Nathaniel H. Park, et al. "Expanding the cationic polycarbonate platform: attachment of sulfonium moieties by postpolymerization ring opening of epoxides." ACS Macro Lett. 5, 1247-1252 (2016). 6 pages.

Chan, Julian M. W., et al. "Chemically modifiable N-heterocycle-functionalized polycarbonates as a platform for diverse smart biomimetic nanomaterials." Chemical Science. vol. 5, 3294 (2014). 7 pages.

(56) References Cited

OTHER PUBLICATIONS

Isik, Mehmet, et al. Tuning the Selectivity of Biodegradable Antimicrobial Cationic Polycarbonates by Exchanging the Counter-Anion. Macromolecular Bioscience (2016). 8 pages.

Kubo, Tomohiro, et al. "Multifunctional homopolymers: postpolymerization modification via sequential nucleophilic aromatic substitution." Macromolecules (2016). 8 pages.

Spokoyny, Alexander M., et al. "A perfluoroaryl-cysteine S(N)Ar chemistry approach to unprotected peptide stapling." Journal of the American Chemical Society, 135, 5946-5949 (2013). 4 pages.

Park, Nathaniel H., et al. "Organocatalyzed synthesis of fluorinated poly(aryl thioethers)." Nature Communications. vol. 8, Issue 1, Dec. 2017. 7 pages.

Pratt, Russell C., et al. "Exploration, optimization, and application of supramolecular thiourea-amine catalysts for the synthesis of lactide (co)polymers." Macromolecules vol. 39, 7863-7871 (2006). 9 pages.

Hall, Brady. "Synthesis, Characterization, and Polymerization of Sulfonamide Based Bifunctional Monomers." 2016, 83 pages.

Quast, Matthew J., et al., "Hyperbranched Polyfluorinated benzyl ether polymers: Mechanism, kinetics, and optimization." Journal of Polymer Science Part A: Polymer Chemistry, 2014, pp. 985-994. 10 pages.

Mell, Peter, et al. "The NIST Definition of Cloud Computing." National Institute of Standards and Technology. Sep. 2011. 7 pages.

International Search Report and Written Opinion received for PCT Application Serial No. PCT/IB2018/059556, dated Mar. 20, 2019, 9 pages.

Lui, et al. "A switch from anionic to bifunctional H-bonding catalyzed ring-opening polymerizations towards polyether-polyester diblock copolymers." Polym. Chem., 2018, 9, 154-159. 6 pages.

Non-Final Office Action received for U.S. Appl. No. 15/839,420 dated Jan. 30, 2020, 92 pages.

Non-Final Office Action received for U.S. Appl. No. 16/028,919 dated Feb. 14, 2020, 32 pages.

Non-Final Office Action received for U.S. Appl. No. 16/028,989 dated Mar. 30, 2020, 109 pages.

Final Office Action received for U.S. Appl. No. 16/028,919 dated Apr. 9, 2020, 16 pages.

Final Office Action received for U.S. Appl. No. 15/839,420 dated May 19, 2020, 171 pages.

* cited by examiner

704
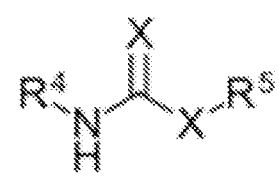 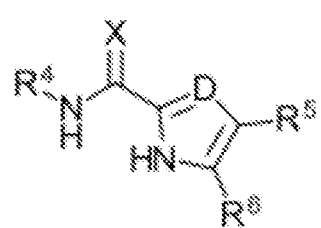
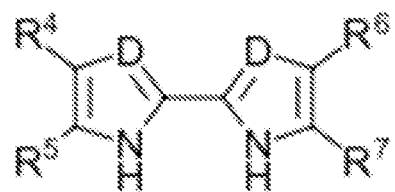 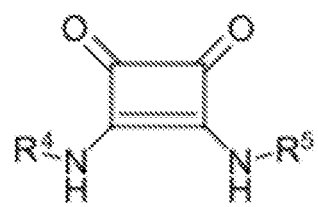
FIG. 8

902 — QUENCHING A RING-OPENING POLYMERIZATION REACTION THAT FORMS A CHEMICAL COMPOUND, WHEREIN THE QUENCHING COMPRISES FORMING A SALT BYPRODUCT, AND WHEREIN THE SALT BYPRODUCT IS A CATALYST

904 — FUNCTIONALIZING, VIA A POST-POLYMERIZATION REACTION WITHIN A FLOW REACTOR, THE CHEMICAL COMPOUND BY COVALENTLY BONDING A TRIMETHYLSILYL PROTECTED THIOL TO A PENDENT FUNCTIONAL GROUP OF THE CHEMICAL COMPOUND IN A PRESENCE OF THE CATALYST, THE PENDENT FUNCTIONAL GROUP COMPRISING A PERFLUOROARYL GROUP AND A METHYLENE GROUP

| QUENCHING A RING-OPENING POLYMERIZATION REACTION THAT FORMS A POLYCARBONATE POLYMER, WHEREIN THE QUENCHING COMPRISES FORMING A SALT BYPRODUCT, AND WHEREIN THE SALT BYPRODUCT IS A CATALYST | ⟵ 1002 |

↓

| FUNCTIONALIZING THE POLYCARBONATE POLYMER BY REACTING A TRIMETHYLSILYL PROTECTED THIOL WITH THE POLYCARBONATE POLYMER IN THE PRESENCE OF THE CATALYST AND WITHIN A FLOW REACTOR, WHEREIN THE POLYCARBONATE POLYMER COMPRISES A PERFLUROARYL GROUP | ⟵ 1004 |

1102 — QUENCHING A RING-OPENING POLYMERIZATION REACTION WITH A CHEMICAL ACID, WHEREIN THE RING-OPENING POLYMERIZATION REACTION FORMS A POLYCARBONATE, AND WHEREIN THE QUENCHING COMPRISES FORMING A SALT BYPRODUCT

1104 — FUNCTIONALIZING, VIA A POST-POLYMERIZATION REACTION WITHIN A FLOW REACTOR, THE POLYCARBONATE, WHEREIN THE POLYCARBONATE COMPRISES A PERFLUOROARYL GROUP, AND WHEREIN THE SALT BYPRODUCT CATALYZES THE FUNCTIONALIZING

```
┌─────────────────────────────────────────────────────┐
│ SWITCHING AN ACTIVE CATALYST OF A RING-OPENING      │
│ POLYMERIZATION FROM AN ANIONIC ORGANOCATALYST TO A  │ ← 1302
│ SECOND ANIONIC ORGANOCATALYST BY A PROTON TRANSFER  │
│ WITH A NEUTRAL CHEMICAL COMPOUND, WHEREIN THE       │
│ PROTON TRANSFER NEUTRALIZES THE ANIONIC             │
│ ORGANOCATALYST AND IONIZES THE NEUTRAL CHEMICAL     │
│ COMPOUND                                            │
└─────────────────────────────────────────────────────┘
                          ↓
┌─────────────────────────────────────────────────────┐
│ QUENCHING THE RING-OPENING POLYMERIZATION, WHEREIN  │ ← 1304
│ THE RING-OPENING POLYMERIZATION FORMS A             │
│ POLYCARBONATE POLYMER                               │
└─────────────────────────────────────────────────────┘
                          ↓
┌─────────────────────────────────────────────────────┐
│ MODIFYING THE POLYCARBONATE POLYMER VIA A POST-     │
│ POLYMERIZATION REACTION WITHIN A FLOW REACTOR,      │
│ WHEREIN THE POST-POLYMERIZATION REACTION COMPRISES  │ ← 1306
│ REACTING A PERFLUOROARYL GROUP OF THE               │
│ POLYCARBONATE POLYMER WITH A TRIMETHYLSILYL         │
│ PROTECTED THIOL IN THE PRESENCE OF A CATALYST       │
└─────────────────────────────────────────────────────┘
```

RING-OPENING POLYMERIZATIONS USING A FLOW REACTOR

STATEMENT REGARDING FEDERALLY SPONSORED RESEARCH OR DEVELOPMENT

This invention was made with Government support under contract 1607092 awarded by the National Science Foundation. The Government has certain rights in the invention.

BACKGROUND

The subject disclosure relates to the use of a flow reactor to facilitate one or more ring-opening polymerizations, and more specifically, to using one or more flow reactors to facilitate one or more ring-opening polymerizations and/or post-polymerization modifications.

The United States federal government publishes regulations (e.g., Good Manufacturing Practices (GMP)) to ensure the quality of pharmaceutical compounds, medical devices, and/or food. These regulations can regard the manufacturing, processing, packaging, and/or formulation of various products. Moreover, these regulations address issues of production, starting materials, sanitation, cleanliness of equipment, and/or monitoring through requisite tests. To meet these regulations, traditional industrialization techniques in the chemical industry have included batch processing, in which a series of operations are carried out over a period of time on a separate, identifiable item or parcel of material. Numerous chemical process industries retain batch processing as their primary method of manufacture. For example, products traditionally manufactured by batch processing can include pharmaceuticals, agrochemicals, dyestuffs, food additives, vitamins, and/or the like. For instance, numerous polymers, such as polyesters and/or polycarbonates, have been traditionally manufactured using batch processing.

However, batch processing can be time-consuming, require the design of manufacturing stages that can be difficult to reproduce, can necessitate adverse safety conditions (e.g., due to the transportation of chemicals and/or storage of volatile chemicals), can require a large labor force, and/or can be difficult to automate.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, apparatuses, and/or methods that can regard one or more ring-opening polymerizations within one or more flow reactors are described.

According to an embodiment, a method is provided. The method can comprise functionalizing, via a post-polymerization reaction within a flow reactor, a chemical compound by covalently bonding a trimethylsilyl protected thiol to a pendent functional group of the chemical compound in a presence of a catalyst. The pendent functional group can comprise a perfluoroaryl group and a methylene group. An advantage of such a method can include the implementation of continuous processing to increase chemical reaction rates, as compared to traditional techniques.

In some examples, the ring-opening polymerization reaction is performed within the flow reactor and comprises polymerizing a cyclic carbonate monomer in the presence of an anionic organocatalyst. Further, the ring-opening polymerization reaction can further comprise switching an active catalyst from the anionic organocatalyst to a second anionic organocatalyst by a proton transfer with a neutral chemical compound. The proton transfer can neutralize the anionic organocatalyst and ionize the neutral chemical compound. An advantage of such a method can include the implementation of continuous processing to manufacture one or more copolymers (e.g., block copolymers).

According to another embodiment, a method is provided. The method can comprise functionalizing a polycarbonate polymer by reacting a trimethylsilyl protected thiol with the polycarbonate polymer in the presence of a catalyst and within a flow reactor. The polycarbonate polymer can comprise a perfluoroaryl group. An advantage of such a method can include the implementation of continuous processing to achieve manufacturing techniques that are highly reproducible, as compared to traditional industrialized polymerizations.

In some examples, the ring-opening polymerization reaction is performed within the flow reactor and comprises polymerizing a cyclic carbonate monomer in the presence of an anionic organocatalyst. Also, the ring-opening polymerization reaction can further comprise switching an active catalyst from the anionic organocatalyst to a second anionic organocatalyst by a proton transfer with a neutral chemical compound. The proton transfer can neutralize the anionic organocatalyst and ionize the neutral chemical compound. An advantage of such a method can be that an active catalyst can be switched during continuous processing of a copolymer to facilitate varying chemical reaction rates.

According to another embodiment, a method is provided. The method can comprise quenching a ring-opening polymerization reaction with a chemical acid. The ring-opening polymerization reaction can form a polycarbonate. Also, the quenching can comprise forming a salt byproduct. The method can also comprise functionalizing, via a post-polymerization reaction within a flow reactor, the polycarbonate. The polycarbonate can comprise a perfluoroaryl group, and the salt byproduct can catalyze the functionalizing. An advantage of such a method can include rapid poly-polymerization functionalization in performed in a readily reproducible manner.

In some examples, the ring-opening polymerization reaction can be performed within the flow reactor and can comprise polymerizing a cyclic carbonate monomer in the presence of an anionic organocatalyst. Further, the ring-opening polymerization reaction can also comprise switching an active catalyst from the anionic organocatalyst to a second anionic organocatalyst by a proton transfer with a neutral chemical compound. The proton transfer can neutralize the anionic organocatalyst and ionize the neutral chemical compound. An advantage of such a method can be that copolymers can be formed more quickly than can otherwise achieved by using conventional techniques.

According to another embodiment, a method is provided. The method can comprise modifying a polycarbonate polymer via a post-polymerization reaction within a flow reactor. The post-polymerization reaction can comprise reacting a perfluoroaryl group of the polycarbonate polymer with a trimethylsilyl protected thiol in the presence of a catalyst. An advantage of such a method can include functionalizing one or more polycarbonates while minimizing degradation of the polycarbonates' molecular backbones.

In some examples, the ring-opening polymerization can be performed within the flow reactor and comprises polymerizing a cyclic carbonate monomer in the presence of an anionic organocatalyst. Also, the ring-opening polymerization can further comprise switching an active catalyst from the anionic organocatalyst to a second anionic organocatalyst by a proton transfer with a neutral chemical compound. The proton transfer can neutralize the anionic organocatalyst and ionize the neutral chemical compound. An advantage of such a method can include minimizing the cost of functionalizing polycarbonates by utilizing continuous processing techniques.

BRIEF DESCRIPTION OF THE DRAWINGS

FIG. 8 illustrates a diagram of example, non-limiting neutral chemical compounds that can facilitate a catalyst switch between two or more anionic catalysts with unique identities in order to facilitate one or more ROPs within one or more flow reactors in accordance with one or more embodiments described herein.

FIG. 9 illustrates a flow diagram of an example, non-limiting method that can facilitate forming a polymer (e.g., a block copolymer) via a one or more ring-opening polymerization within one or more flow reactors, wherein the one or more ring-opening polymerizations can be facilitated by a changing an active catalyst from one anionic catalyst to another anionic catalyst in accordance with one or more embodiments described herein.

FIG. 10 illustrates a flow diagram of an example, non-limiting method that can facilitate forming a polymer (e.g., a block copolymer) via a one or more ring-opening polymerization within one or more flow reactors, wherein the one or more ring-opening polymerizations can be facilitated by a changing an active catalyst from one anionic catalyst to another anionic catalyst in accordance with one or more embodiments described herein.

FIG. 11 illustrates a flow diagram of an example, non-limiting method that can facilitate forming a polymer (e.g., a block copolymer) via a one or more ring-opening polymerization within one or more flow reactors, wherein the one or more ring-opening polymerizations can be facilitated by a changing an active catalyst from one anionic catalyst to another anionic catalyst in accordance with one or more embodiments described herein.

FIG. 13 illustrates a flow diagram of an example, non-limiting method that can facilitate forming a polymer (e.g., a block copolymer) via a one or more ring-opening polymerization within one or more flow reactors, wherein the one or more ring-opening polymerizations can be facilitated by a changing an active catalyst from one anionic catalyst to another anionic catalyst in accordance with one or more embodiments described herein.

DETAILED DESCRIPTION

Figure 1A:
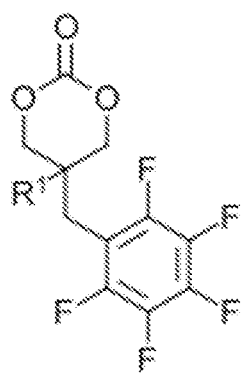
FIG. 1A illustrates a diagram of example, non-limiting cyclic carbonate monomers that can be utilized in ring-opening polymerizations within one or more flow reactors in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the above problems with conventional techniques for polymerizing chemical compounds with batch processing; the present disclosure can be implemented to produce a solution to one or more of these problems in the form of a continuous production technique that can utilize organocatalysts within a flow reactor to produce one or more polymers (e.g., polyesters and/or polycarbonates). Continuous flow production techniques can take advantage of miniaturization, improved kinetic control, and/or expanded temperature ranges to circumvent many of the disadvantages associated with batch processing (e.g., long production times associated with heating and/or cooling batch reactors). Thus, continuous flow production designs can allow for: effective heat transfer, effective mixing, waste minimization, real time analysis, cleaner chemical products, novel chemical reactions, ease of scalability, and/or short reaction times. Further, one or more systems described herein can advantageously control and/or manipulate polymerization conditions of a flow reactor to: solve problems of reproducibility traditionally exhibited by batch processing, optimize polymerization conditions, and/or facilitate discovery of novel chemical compounds.

One or more embodiments described herein can regard forming homopolymers (e.g., polycarbonates) via one or more ring-opening polymerizations ("ROP") conducted within one or more flow reactors. For example, the one or more ROPs can comprise polymerizing one or more cyclic carbonate monomers in the presence of an anionic catalyst (e.g., derived from a reaction with a chemical base). Thus, one or more embodiments can regard a continuous flow production of polymers (e.g., polycarbonates) via one or more ROPs within one or more flow reactors; wherein, as compared to traditional batch production techniques, the continuous flow production can achieve faster reaction times, a narrower dispersity of polymers, and/or tunable control over molecular weight distributions. Further, one or more embodiments described herein can comprise post-synthesis functionalization of polycarbonate scaffolds with minimal degradation of backbone while giving a high degree of control over polymer functionalization.

Additionally, use of the anionic catalysts described herein can provide a wide range of organocatalyst compounds, which can thereby provide a wide range of available catalytic activity. One or more embodiments can regard utilizing the wide range of available catalytic activity to facilitate the formation of multiblock copolymers via continuous flow productions, such as multiple ROPs within one or more flow reactors. For example, a first block of a given block copolymer can be polymerized via ROP within a flow reactor, which can be facilitated by a first anionic catalyst. A second block of the given block copolymer can be polymerized via another ROP within the flow reactor, which can be facilitated by a second anionic catalyst. A switch of the active catalyst from the first anionic catalyst to the second anionic catalyst can be performed via a proton transfer reaction conducted within the flow reactor. By switching the active catalyst, the catalytic activity within the flow reactor can be adjusted based on the cyclic monomer subject to ROP, wherein different cyclic monomers can be subject to ROP at different stages of flow through the flow reactor. In other words, a stream of chemical reactants can flow through the flow reactor thereby undergoing one or more ROPs to form a multiblock copolymer, wherein one or more additional chemical reactants can be injected into the flowing stream to facilitate formation of a block of the copolymer and/or a switch of the active catalyst.

As used herein, the term "flow reactor" can refer to a device in which one or more chemical reactions can take place within one or more channels (e.g., microfluidic channels). For example, a flow reactor can facilitate continuous flow production, as opposed to batch production. One or more streams of chemical reactants can flow (e.g., continuously) through the one or more channels of the flow reactor, wherein one or more chemical reactions (e.g., polymerizations, protonations, and/or deprotonations) involving the chemical reactants can occur within the one or more channels as the one or more streams flow.

As used herein, the term "anionic catalyst" can refer to an organocatalyst comprising one or more anions that can be formed from a deprotonation of one or more nitrogen-hydrogen bonds. For example, an anionic catalyst can comprise a molecular backbone having one or more anionic groups bonded (e.g., covalently) to one or more functional groups.

Figure 1B:
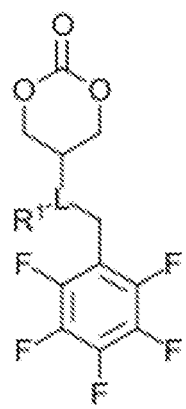
FIG. 1B illustrates a diagram of example, non-limiting cyclic carbonate monomers that can be utilized in ring-opening polymerizations within one or more flow reactors in accordance with one or more embodiments described herein.

FIGS. 1A-B illustrate diagrams of example, non-limiting cyclic carbonate monomers 100 that can be used to create one or more perfluoroaryl polycarbonates. Repetitive description of like elements employed in other embodiments described herein is omitted for sake of brevity. One of ordinary skill in the art will recognize that the chemical structures for the one or more cyclic carbonate monomers 100 shown in FIGS. 1A-B are exemplary and the one or more cyclic carbonate monomers 100 can be characterized by a wide variety of chemical structures that comprise a carbonate group in a ring formation and one or more perfluoroaryl groups.

As shown in FIG. 1A, the one or more cyclic carbonate monomers 100 can comprise one or more carbonate groups. Further, the one or more cyclic carbonate monomers 100 can comprise one or more perfluoroaryl group directly bonded to a molecular backbone of the cyclic carbonate monomer 100. For example, the one or more cyclic carbonate monomers 100 can comprise one or more perfluorophenyl groups directly bonded to their respective molecular backbones. The one or more perfluoroaryl groups can comprise one or more aryls with a various number of ring members ranging from greater than or equal to four ring members and less than or equal to 10 ring members. For example, the one or more pendent functional groups can be perfluorobenzyl groups. Additionally, the one or more cyclic carbonate monomers 100 can also comprise one or more first functional groups (e.g., represented by "$R^1$"). The one or more first functional groups can comprise alkyl and/or aryl structures. For example, the one or more first functional groups can comprise, but are not limited to: carboxyl groups, carbonyl groups, ester groups, ether groups, ketone groups, amine groups, phosphine groups, urea groups, carbonate groups, alkenyl groups, hydroxyl groups, a combination thereof, and/or the like. In addition, one or more methylene groups can serve to link the one or more perfluoroaryl groups to the molecular backbone of the one or more cyclic carbonate monomers 100. The one or more perfluoroaryl groups can serve as pendent functional groups that can facilitate post-synthesis modification of one or more polycarbonates formed from one or more ring-opening polymerizations ("ROPs") of the one or more cyclic carbonate monomers 100.

As shown in FIG. 1B, the one or more cyclic carbonate monomers 100 can also comprise one or more linkage groups (e.g., represented by "L"). The one or more linkage groups can connect the one or more perfluoroaryl groups and/or the one or more first functional groups (e.g., represented by "$R^1$") to the molecular backbone of the one or more cyclic carbonate monomers 100. The one or more linkage groups (e.g., represented by "L") can comprise alkyl and/or aryl structures. For example, the one or more linkage groups (e.g., represented by "L") can comprise, but are not limited to: carboxyl groups, carbonyl groups, ester groups, ether groups, ketone groups, amine groups, phosphine groups, urea groups, carbonate groups, alkenyl groups, hydroxyl groups, a combination thereof, and/or the like. In addition, one or more methylene groups can serve to link the one or more perfluoroaryl groups to the one or more linkage groups (e.g., represented by "L").

Figure 2:
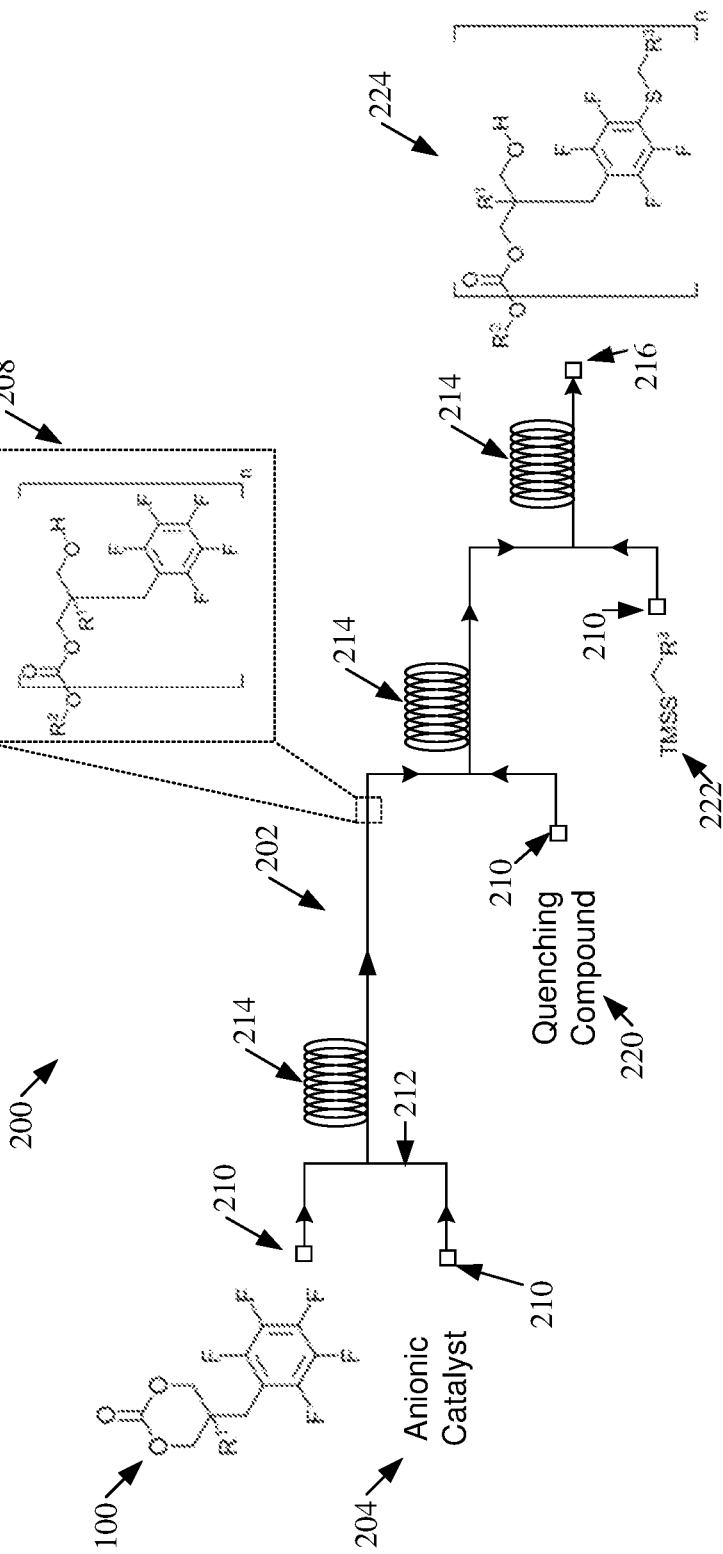
FIG. 2 illustrates a diagram of an example, non-limiting polymerization scheme that can comprise one or more ring-opening polymerizations within one or more flow reactors in accordance with one or more embodiments described herein.

FIG. 2 illustrates a diagram of an example, non-limiting polymerization scheme 200 that can facilitate ROP of the one or more cyclic carbonate monomers 100 within one or more flow reactors 202 in accordance with one or more embodiments described herein. Repetitive description of like elements employed in other embodiments described herein is omitted for sake of brevity. While one or more particular chemical reactants and/or products are depicted, additional embodiments of the polymerization scheme 200 shown in FIG. 2 are also envisaged. For example, the principal mechanism of the polymerization scheme 200 can be applied to cyclic carbonate monomers 100 characterized by the chemical structures depicted in FIG. 1A, FIG. 1B, and/or other cyclic carbonate monomer 100 variants comprising one or more perfluoroaryl groups. FIG. 2 depicts the use of the cyclic carbonate monomer 100 shown in FIG. 1A for exemplary purposes.

As shown in FIG. 2, the polymerization scheme 200 can comprise ROP of the one or more cyclic carbonate monomers 100 within one or more flow reactors 202 (e.g., via a continuous flow production). Catalyst choice can directly affect the control over the one or more ROPs as well as the potential for deleterious transesterification reactions on the molecular backbone of produced polymers (e.g., homopolymers and/or copolymers), causing a broadening of the molecular weight distribution. Additionally, catalyst choice can determine the kinetics of polymerization and hence the residence times in the one or more flow reactors, affecting overall reactor throughput.

The one or more ROPs depicted via the polymerization scheme 200 of FIG. 2 can comprise one or more anionic catalysts 204. The variety of anionic catalysts 204 can afford high selectivity and/or control over the ROPs within the one or more flow reactors 202. Additionally, carious anionic catalysts 204 can exhibit very fast kinetics of polymerization, thereby potentially allowing for very short reactor residence times. Moreover, the reactivity of one or more cyclic carbonate monomers 100 can be matched with an appropriate anionic catalyst 204 to facilitate controlled polymerization and minimization of molecular backbone transesterification.

Additionally, the one or more ROPs depicted via the polymerization scheme 200 can be performed at room temperature (e.g., at a temperature greater than or equal to 5 degrees Celsius (° C.) and less than or equal to 70° C.). Further, the one or more ROPs depicted via the polymerization schemes of FIG. 2 can be characterized by residence times within the one or more flow reactors 202 ranging from, for example, greater than or equal to 0.006 seconds and less than or equal to 3.5 seconds. Moreover, the one or more ROPs depicted via the polymerization scheme 200 can produce products characterized by narrow molecular weight distributions (Đ) ranging from, for example, greater than or equal to 1.07 and less than or equal to 1.15.

In one or more embodiments, the one or more anionic catalyst 204 can be derived using one or more chemical bases. However, one of ordinary skill in the art will recognize that the one or more anionic catalyst 204 can be derived through a variety of methodologies. Wherein a chemical base is used to derive the one or more anionic catalysts 204, the one or more chemical bases can comprise organic bases and/or strong metal containing bases. Example chemical bases can include, but are not limited to: 1,8-diazabicyclo[5.4.0]undec-7-ene ("DBU"), 7-methyl-1,5,7-triazabicyclo[4.4.0]dec-5-ene ("MTBD"), phosphazene bases, 1,3,2-diazaphosphorin-2-amin, 2-[(1,1-dimethylethyl)imino]-N,N-diethyl-1,2,2,2,3,4,5,6-octahydro-1,3-dimethyl ("BEMP"), 1,3-dihydro-1,3-bis(2,4,6-trimethylphenyl)imidazole-2-ylidene ("IMes"), potassium methoxide, potassium hydride, sodium methoxide, sodium hydride, a combination thereof, and/or the like.

As shown in FIG. 2, the polymerization scheme 200 can comprise one or more ROPs of one or more cyclic carbonate monomers 100 in the presence of one or more anionic catalysts 204 (e.g., derived from one or more chemical bases) to produce one or more polycarbonates 208 comprising one or more perfluoroaryl groups (e.g., respectively connected to a linkage group and/or the molecular backbone via one or more methylene groups). As shown in FIG. 2, "n" can be an integer greater than or equal to 1 (e.g., ranging from, for example, greater than or equal to 1 and less than or equal to 1000). Additionally, the one or more polycarbonates 208 can comprise one or more second functional groups (e.g., represented by "$R^2$"), which can be derived from the one or more chemical bases.

The one or more flow reactors 202 can comprise, for example, one or more inlets 210, one or more channels 212, one or more reactor loops 214, and/or one or more outlets 216. The one or more channels 212 can extend from the one or more inlets 210 to the one or more outlets 216. The one or more channels 212 (e.g., microfluidic channels) can comprise, for example: tubes (e.g., microfluidic tubes), pipes, joiners (e.g., T-mixers), a combination thereof, and/or the like. Additionally, the one or more channels 212 can be oriented into one or more reactor loops 214 at one or more stages between the one or more inlets 210 and/or the one or more outlets 216. The one or more reactor loops 214 can influence the length of the one or more flow reactors 202 and thereby the residence time of the one or more ROPs within the one or more flow reactors 202. One of ordinary skill in the art will recognize that the number of loops comprising the reactor loops 214 and/or the dimensions of the loops can vary depending on a desired flow rate, residence time, and/or turbulence. Further, while the reactor loops 214 are depicted in FIG. 2 as characterized by circular shaped structures, the architecture of the reactor loops 214 is not so limited. For example, the one or more reactor loops 214 can be characterized by elliptical and/or polygonal shaped structures.

In the polymerization scheme 200, the one or more cyclic carbonate monomers 100 can enter the one or more flow reactors 202 via one or more first inlets 210, while the one or more anionic catalysts 204 can enter the one or more flow reactors 202 via one or more second inlets 210. The one or more cyclic carbonate monomers 100 can meet and/or mix with the one or more anionic catalysts 204 within the one or more channels 212 of the one or more flow reactors 202; thereby forming a stream of chemical reactants. As the stream flows through the one or more flow reactors 202, one or more ROPs can be facilitated by the one or more anionic catalysts 204, whereby the one or more cyclic carbonate monomers 100 can be polymerized to form one or more polycarbonates 208 (e.g., a homopolymer solution of polycarbonates 208 and/or a copolymer solution of polycarbonates 208).

In one or more embodiments, one or more initiators and/or solvents can also be introduced (e.g., via one or more inlets 210) into the one or more flow reactors 202 to facilitate one or more ROPs to produce one or more polycarbonates 208. For example, the one or more initiators and/or solvents can be introduced into the one or more flow reactors 202 with the one or more cyclic carbonate monomers 100. In another example, the one or more initiators and/or solvents can be introduced into the one or more flow reactors 202 via one or more inlets 210 that are separate from the one or more inlets 210 utilized to introduce the one or more cyclic carbonate monomers 100 (e.g., similar to how the one or more anionic catalysts 20 are introduced to the one or more flow reactors 202 via a distinct inlet 210 in FIG. 2).

The one or more initiators can be microinitiators. Further, the one or more initiators can be block polymers and comprise a water-soluble block. For example, the one or more initiators can comprise poly(ethylene glycol) ("PEG") with various molecular weights. For example, the one or more initiators can comprise PEG with a molecular weight ranging from 4,800 grams per mole (g/mol) to 5,500 g/mol ("mPEG$_{5K}$"). In another example, the one or more initiators can comprise PEG with a molecular weight ranging from 9,500 g/mol to 10,500 g/mol ("mPEG$_{10K}$"). Moreover, the one or more initiators can comprise a functional group, such as a hydroxy group, to facilitate the ROP. The solvent can be an organic solvent such as 1-(3,5-bis(trifluoromethyl)-phenyl)-3-cyclohexyl-2-thiourea ("TU").

Therefore, the stream of chemical reactants can undergo one or more ROPs to form a stream of polycarbonates 208 within the one or more channels 212 of the one or more flow reactors 202 (e.g., as illustrated using dashed lines in FIG. 2). Additionally, one or more quenching compounds 220 and/or one or more trimethylsilyl protected thiols ("TMSS") 222 can be added to the stream of polycarbonates 208.

The one or more quenching compounds 220 can be introduced into the one or more flow reactors 202 via one or more distinct inlets 210. The one or more quenching compounds 220 can quench the ROP within the one or more channels 212 that forms the one or more polycarbonates 208. The one or more quenching compounds 220 can be characterized by being acidic in nature (e.g., comprising a carboxylate group). Example quenching compounds 220 can include, but are not limited to: benzoic acid, acetic acid, trifluoroacetic acid, a combination thereof, and/or the like. The quenching of the ROPs, by the one or more quenching compounds 220, can create one or more salt byproducts. For example, the one or more salt byproducts can be basic salts, organic, and/or polar. For instance, a basic salt byproduct can form from quenching the one or more ROPs with benzoic acid.

In one or more embodiments, a solvent can be introduced (e.g., with the one or more quenching compounds 220 or separately) into the one or more flow reactors 202 via one or more inlets 210 to facilitate the quenching. Example solvents include, but are not limited to dimethylformamide ("DMF"), N-methyl-2-pyrrolidone ("NMP"), dimethylacetamide ("DMA"), dimethylsulfoxide ("DMSO"), acetonitrile ("MeCN"), a combination thereof, and/or the like.

The one or more quenching compounds 220 can mix with the one or more polycarbonates 208 within one or more channels 212 and/or one or more reactor loops 214 of the one or more flow reactors 202. Further, the one or more salt byproducts can act as catalysts to facilitate a post-polymerization modification to the one or more polycarbonates 208 by the one or more TMSS 222 to form one or more functionalized polycarbonates 224. The one or more quenched polycarbonates 208 and/or the one or more salt byproducts can continue to flow through the one or more flow reactors 202. The one or more TMSS 222 can further be introduced downstream of the quenching via one or more other distinct inlets 210 (e.g., as shown in FIG. 2). The one or more TMSS 222 can comprise one or more third functional groups (e.g., represented by "R$^3$"). The one or more third functional groups (e.g., represented by "R$^3$") can comprise: alkyl structures, aryl structures, carboxyl groups, carbonyl groups, amine groups, amide groups, ether groups, ester groups, ketone groups, hydroxyl groups, alkenyl groups, aldehyde groups, alkene groups, a combination thereof, and/or the like. For example, the one or more third functional groups (e.g., represented by "R$^3$") can be undecane, thereby the one or more trimethylsilyl protected thiols can be trimethylsilyl protected dodecanethiol. As shown in FIG. 2, the one or more TMSS 222 can react with the one or more perfluoroaryl groups of the one or more polycarbonates 208, as catalyzed by the one or more salt byproducts, to further functionalize the one or more polycarbonates 208 with the one or more third functional groups (e.g., represented by "R$^3$"). For example, one or more of the fluorine atoms can be substituted with one or more of the third functional groups (e.g., represented by "R$^3$"). The catalytic activity of the one or more salt byproducts can vary based on, for example: the concentration of the one or more salt byproducts within the stream of chemicals; and/or the acidity of the one or more salt byproducts. For instance, more basic salt byproducts can exhibit greater catalytic activity with regards to the one or more post-polymerization modification reactions.

Also, as shown in FIG. 2, the post-polymerization modification reaction can occur in flow within the one or more flow reactors 202. In other words, the one or more ROPs can be performed at one or more first stages of the one or more flow reactors 202, quenching of the one or more ROPs can occur at one or more second stages of the one or more flow reactors 202 (e.g., producing one or more salt byproducts), and one or more post-polymerization modification reactions can be performed at one or more third stages of the one or more flow reactors 202 (e.g., wherein the one or more salt byproducts can act as catalysts). The post-polymerization modification can occur within the one or more channels 212 and/or reactor loops 214 of the one or more flow reactors 202. Further, the one or more post-polymerization modifications described herein (e.g., as shown in FIG. 2) can be characterized by residence times within the one or more flow reactors 202 ranging from, for example, greater than or equal to 10 seconds and less than or equal to 10 minutes (e.g., less than or equal to 5 minutes). Further, each of the respective inlets 210 can be controlled independently of the other inlets 210. Therefore, respective chemicals can be introduced into the one or more flow reactors 202 at respective quantities, speeds, and/or pressures.

Figure 3:
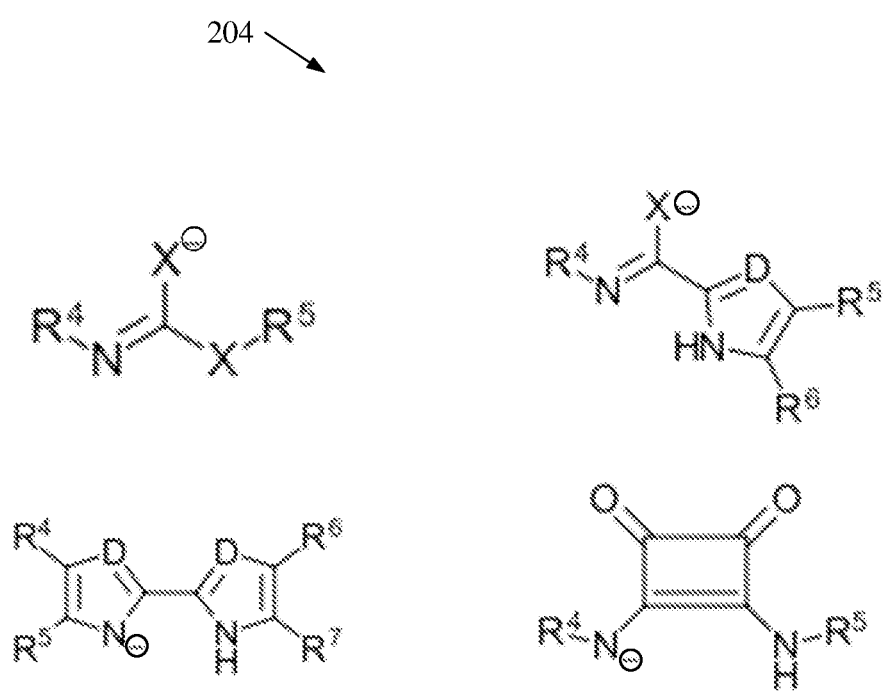
FIG. 3 illustrates a diagram of example, non-limiting anionic catalysts that can facilitate one or more ROPs of one or more cyclic carbonate monomers within one or more flow reactors in accordance with one or more embodiments described herein.

FIG. 3 illustrates a diagram of example, non-limiting anionic catalysts 204 that can be utilized in one or more ROP of the one or more cyclic carbonate monomers 100 within one or more flow reactors 202 in accordance with one or more embodiments described herein. Repetitive description of like elements employed in other embodiments described herein is omitted for sake of brevity. For example, FIG. 3 depicts four chemical structures that can characterize one or more of the anionic catalyst 204.

As shown in FIG. 3, "X" can represent an oxygen atom (e.g., an oxygen anion), a sulfur atom (e.g., a sulfur anion), and/or a nitrogen atom (e.g., a nitrogen anion). Also, "D" can represent a carbon atom and/or a nitrogen atom. Wherein "X" and/or "D" is a nitrogen atom (e.g., a nitrogen anion) and/or a carbon atom (e.g., a carbon anion), "X" and/or "D" can be bonded to a hydrogen and/or an additional functional group. For example, the additional functional group can comprise an alkyl group and/or an aryl group. Additionally, the one or more anionic catalysts 204 can comprise one or more fourth functional groups (e.g., represented by "R$^4$"), one or more fifth functional groups (e.g., represented by "R$^5$"), one or more sixth functional groups (e.g., represented by "R$^6$"), and/or one or more seventh functional groups (e.g., represented by "R$^7$"). The one or more fourth functional groups (e.g., represented by "R$^4$"), one or more fifth functional groups (e.g., represented by "R$^5$"), one or more sixth functional groups (e.g., represented by "R$^6$"), and/or one or more seventh functional groups (e.g., represented by "R$^7$") can be alkyl groups and/or aryl groups. For example, the one or more fourth functional groups (e.g., represented by "$R^4$"), one or more fifth functional groups (e.g., represented by "$R^5$"), one or more sixth functional groups (e.g., represented by "$R^6$"), and/or one or more seventh functional groups (e.g., represented by "$R^7$") can comprise, but are not limited to: carboxyl groups, carbonyl groups, ester groups, ether groups, ketone groups, amine groups, phosphine groups, urea groups, carbonate groups, alkenyl groups, hydroxyl groups, a combination thereof, and/or the like. The one or more anionic catalyst 204 can be organocatalysts formed by a deprotonation of one or more nitrogen-hydrogen bonds.

Figure 4:
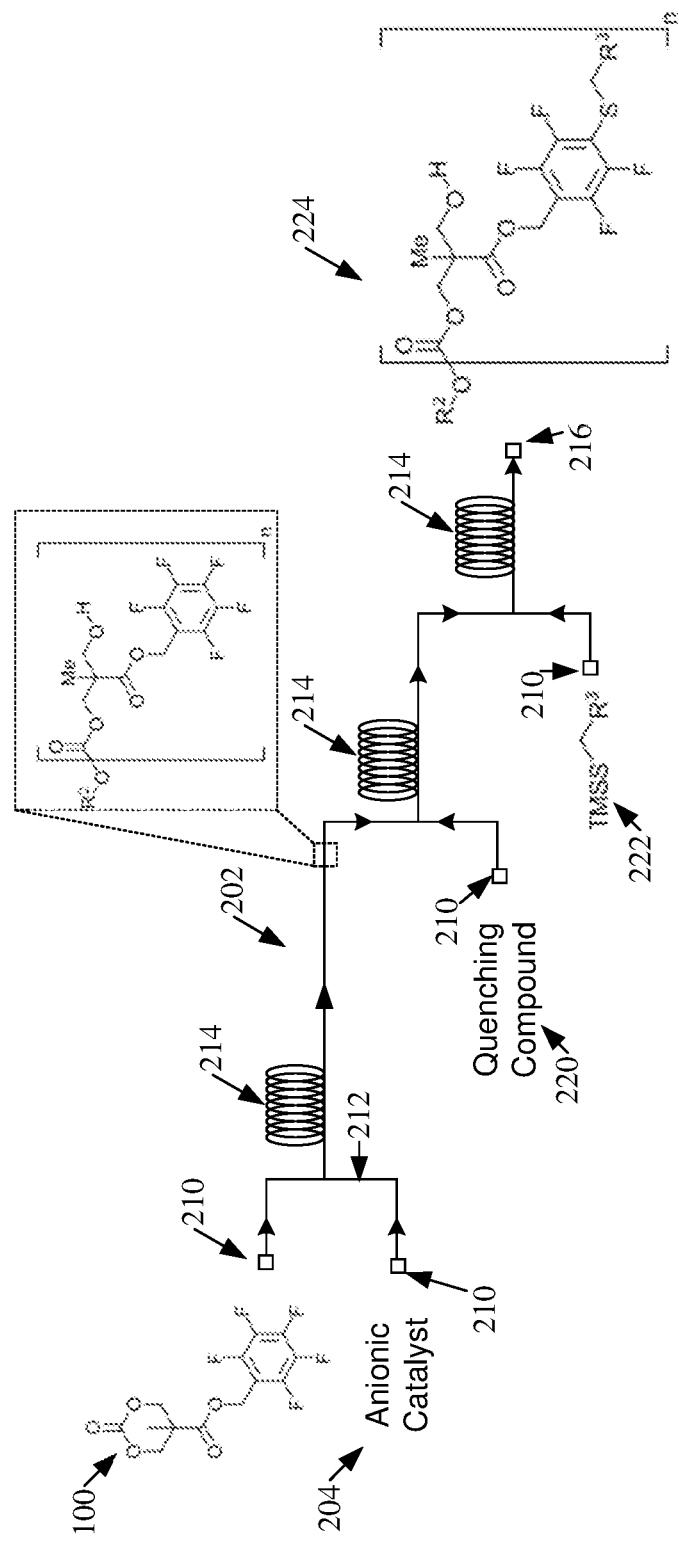
FIG. 4 illustrates a diagram of example, non-limiting polymerization scheme that can comprise one or more ring-opening polymerizations within one or more flow reactors in accordance with one or more embodiments described herein.

FIG. 4 illustrates a diagram of an example, non-limiting ROP and post-polymerization modification in accordance with the polymerization scheme 200 and/or one or more embodiments described herein. Repetitive description of like elements employed in other embodiments described herein is omitted for sake of brevity. FIG. 4 depicts the ROP of an exemplary cyclic carbonate monomer 100, which can be characterized by one or more of the chemical structures presented in FIG. 1. One of ordinary skill in the art will recognize that the principals of polymerization and/or modification shown in FIG. 4 are applied to an exemplary cyclic carbonate monomer 100 and/or can be applied to various cyclic carbonate monomers 100 to create one or more polycarbonate 208 and/or functionalized polycarbonate 224 variants.

Figure 5:
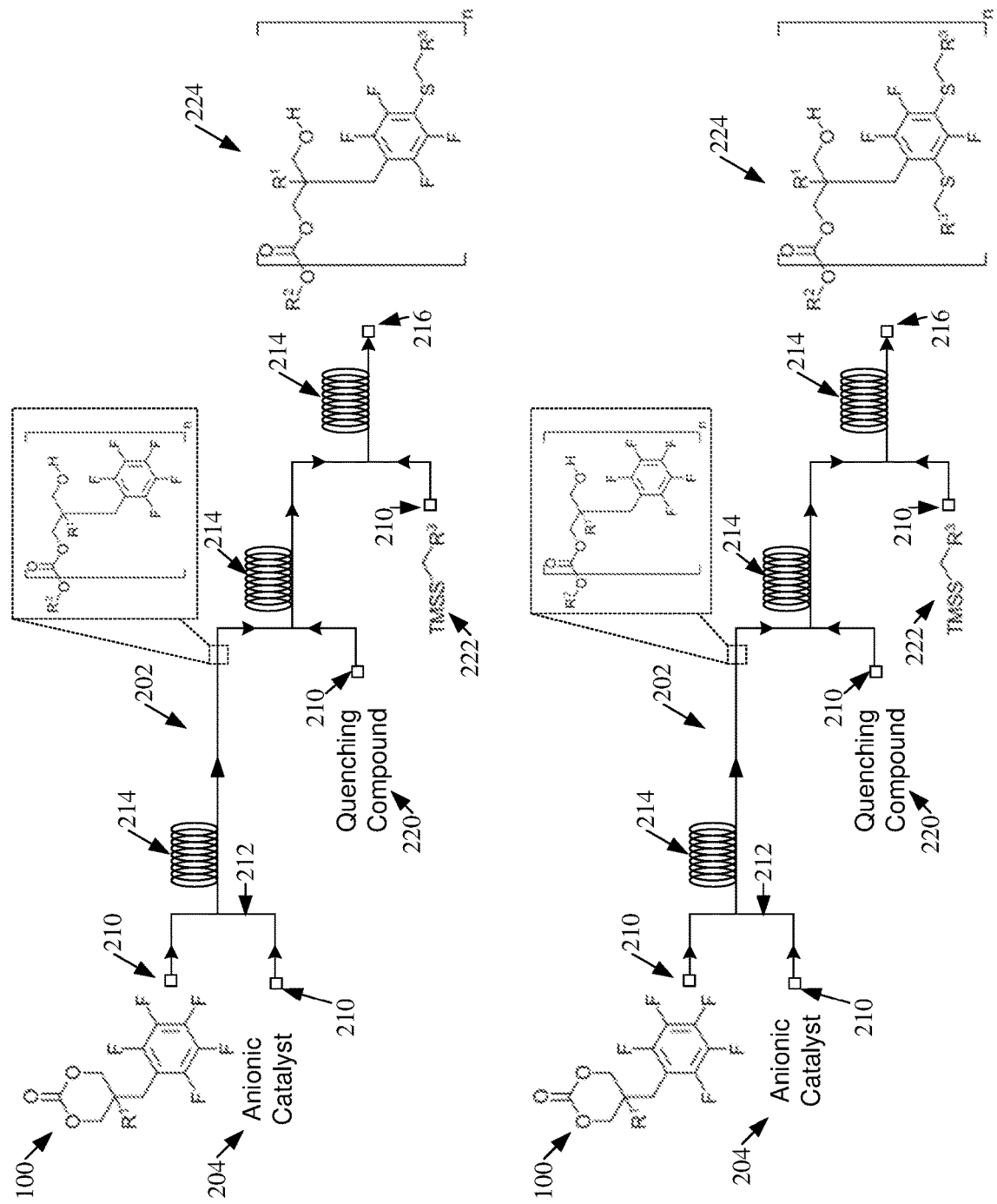
FIG. 5 illustrates a diagram of example, non-limiting polymerization schemes that can comprise one or more ring-opening polymerizations within one or more flow reactors in accordance with one or more embodiments described herein.
Figure 6:
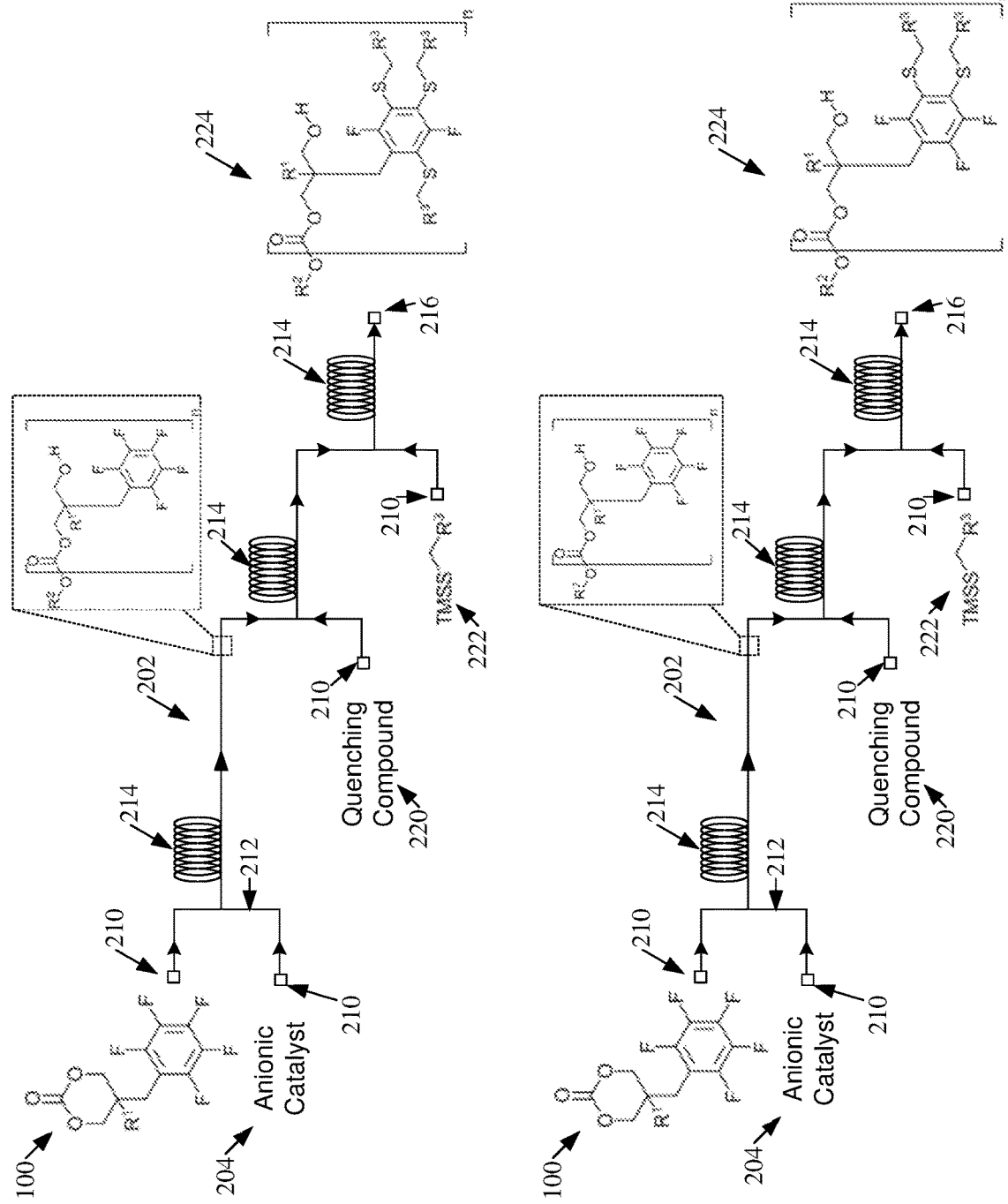
FIG. 6 illustrates a diagram of example, non-limiting polymerization schemes that can comprise one or more ring-opening polymerizations within one or more flow reactors in accordance with one or more embodiments described herein.

FIGS. 5-6 illustrates diagrams of example, non-limiting polymerization schemes that can facilitate ROP of one or more cyclic carbonate monomers 100 and/or post-polymerization modifications of one or more polycarbonates 208 within one or more flow reactors 202 in accordance with one or more embodiments described herein. Repetitive description of like elements employed in other embodiments described herein is omitted for sake of brevity. While one or more particular chemical reactants and/or products are depicted, additional embodiments of the polymerization schemes shown in FIG. 5 are also envisaged. For example, the principal mechanism of the polymerization schemes shown in FIG. 5 can be applied to cyclic carbonate monomers 100 characterized by the chemical structures depicted in FIG. 1A, FIG. 1B, and/or other cyclic carbonate monomer 100 variants comprising one or more perfluoroaryl groups.

As shown in FIGS. 5-6, the post-polymerization modifications, facilitated by the salt byproducts created by quenching the one or more ROPs, can create mono-substituted and/or poly-substituted functionalized polycarbonates 224. As used herein "mono-substituted" can refer to the substitution of a single fluorine atom of a subject perfluoroaryl group. For example, mono-substituted products generated by the post-polymerization modification within the one or more flow reactors 202 can comprise a perfluoroaryl group covalently bonded to a single thiol from the TMSS 222. As used herein "poly-substituted" can refer to the substitution of multiple fluorine atoms of a subject perfluoroaryl group. For example, poly-substituted products generated by the post-polymerization modification within the one or more flow reactors 202 can comprise a perfluoroaryl group covalently bonded to a plurality of thiols from the one or more TMSS 222. Also, as used herein "bi-substituted" can refer to the substitution of two fluorine atoms of a subject perfluoroaryl group. Further, as used herein "tri-substituted" can refer to the substitution of three fluorine atoms of a subject perfluoroaryl group.

The polymerization schemes depicted in FIGS. 5-6 exemplify that the one or more functionalized polycarbonates 224 can be mono-substituted or poly-substituted. For example, the amount of catalyst (e.g., salt byproduct) can affect the functionalization of the one or more polycarbonates 208. For instance, an increased presence of catalyst can directly increase the number of substitutions (e.g., the number of poly-substituted products) achieved by the post-polymerization modification.

Figure 7:
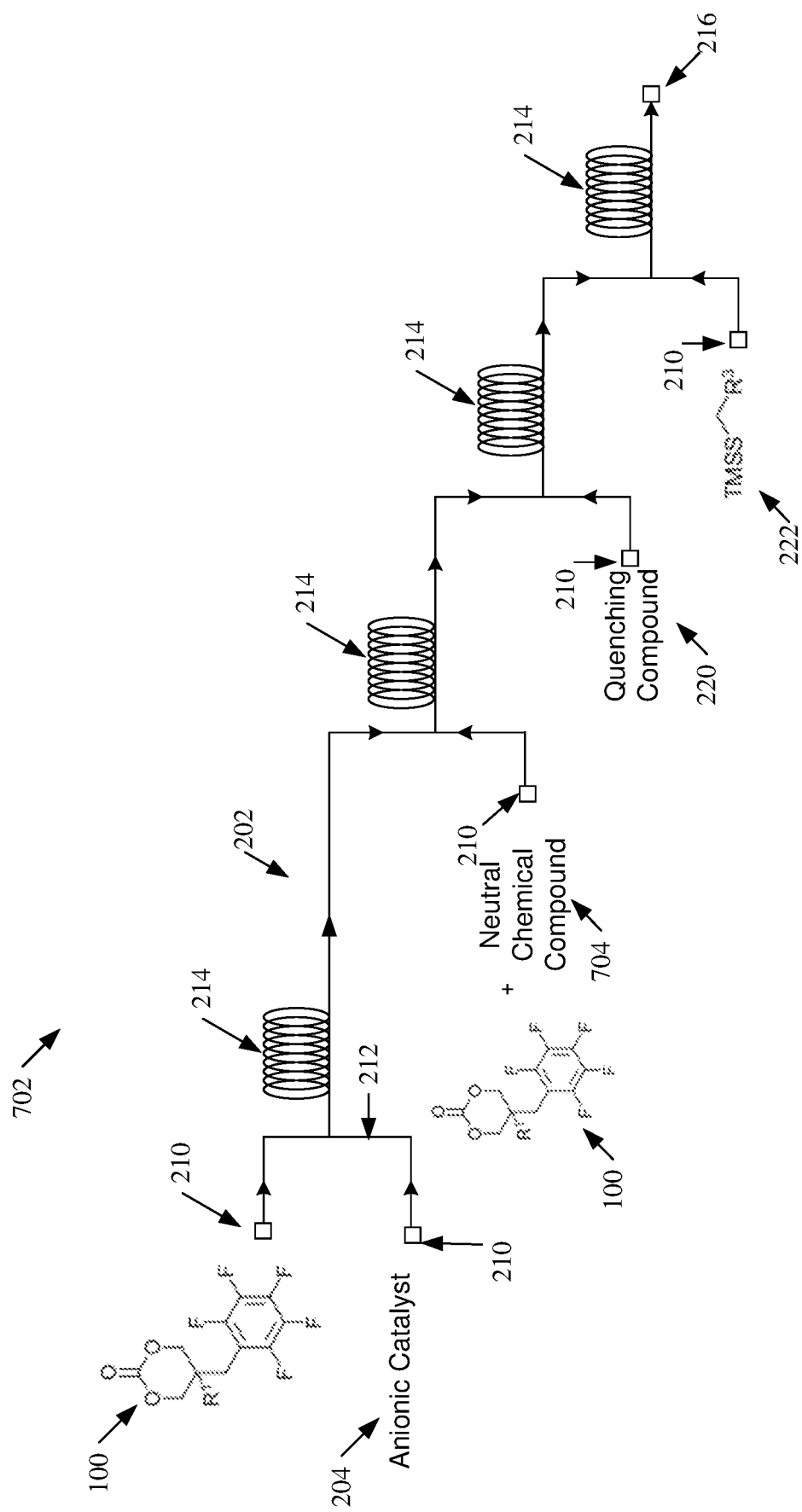
FIG. 7 illustrates a diagram of an example, non-limiting polymerization scheme that can facilitate forming one or more block copolymers via one or more ring-opening polymerizations within one or more flow reactors in accordance with one or more embodiments described herein.

FIG. 7 illustrates a diagram of example, non-limiting polymerization scheme 702 that can facilitate synthesis of one or more copolymers (e.g., block copolymers) via one or more ROP conducted within one or more flow reactors 202 in accordance with one or more embodiments described herein. Repetitive description of like elements employed in other embodiments described herein is omitted for sake of brevity. While one or more particular chemical reactants and/or products are depicted, additional embodiments of the polymerization scheme 702 are also envisaged. For example, the principal mechanism of the polymerization scheme 702 can be applied to cyclic carbonate monomers 100 characterized by the chemical structures depicted in FIG. 1A, FIG. 1B, and/or other cyclic carbonate monomer 100 variants comprising one or more perfluoroaryl groups.

The polymerization scheme 702 depicted in FIG. 7 comprise many of the same features described with regards to FIGS. 2 and 4-6, but with an additional step to facilitate the synthesis of block copolymers. The matching of cyclic carbonate monomers 100 and catalyst reactivity enables a catalyst switch approach for block copolymer synthesis using cyclic carbonate monomers 100 with disparate reactivity profiles. For example, an anionic catalyst 204 for polymerization of the first block can be quenched by the addition of a neutral chemical compound 704 via a proton transfer to generate a new anionic catalyst 204 with a different catalytic activity for the polymerization of the second block.

The syntheses of well-defined block copolymers can be important for many material applications, including the generation of nanoparticles and functional bioactive polymers. Under traditional batch polymerization conditions, the synthesis of block copolymers with narrow molecular weight distributions can be challenging. The polymerization, isolation, and purification of the block copolymer intermediates can be tedious and time consuming for multi-step synthetic processes. Whereas synthesizing block copolymers in one container relies on the efficient addition and mixing of monomers for each sequential block. The utilization of flow reactors 202 (e.g., via continuous flow polymerization) offers an excellent alternative to traditional batch procedures for the preparation multi-block polymers as the monomers for each block can be seamlessly introduced in sequential stages of one or more flow reactors 202 with highly efficient mixing.

For example, with regards to the polymerization scheme 702, ROP of the one or more cyclic carbonate monomers 100 and the one or more anionic catalysts 204 can produce an intermediate polymer that can serve as the first block of a multiblock copolymer. The intermediate polymer can be further polymerized by the introduction of an additional cyclic carbonate monomer 100. For example, the additional cyclic carbonate monomer 100 can enter the one or more flow reactors 202 via a third inlet 210 and can mix with a stream of the intermediate polymer in the one or more channels 212 of the one or more flow reactors 202.

Additionally, in one or more embodiments, one or more neutral chemical compounds 704 can enter the one or more flow reactor 202 (e.g., via the third inlet 112) to facilitate a switch of the active anionic catalyst 204. For example, the one or more neutral chemical compounds 704 can mix in the one or more channels 212 with the anionic catalyst 204 used to synthesize the intermediate polymer; thereby initiating a proton transfer that can neutralize the one or more anionic catalysts 204 and ionize the one or more neutral chemical compounds 704 to form one or more new anionic catalyst 204. In effect, introducing the additional one or more neutral chemical compounds 704 to the stream comprising the intermediate polymer can transform the one or more anionic catalysts 204 to one or more neutral chemical compounds 704 and the additional one or more neutral chemical compounds 704 to one or more anionic catalysts 204; thereby switching the active catalyst from one exemplary anionic catalyst 204 to another.

Thus, an anionic catalyst 204 switch can facilitate two or more ROPs to create one or more polycarbonate copolymers. For example, polymerization scheme 702 can facilitate synthesis of copolymers such as, but not limited to, diblock copolymers and/or triblock copolymers. Moreover, the one or more polycarbonate copolymers can be functionalized via one or more post-polymerization modifications in accordance with the various embodiments described herein. For example, one or more quenching compounds 220 can be introduced into the one or more flow reactors 202 via one or more fourth inlets 210, and the one or more TMSS 222 can be introduced into the one or more flow reactors 202 downstream of the one or more quenching compounds 220 via one or more fifth inlets 210. The one or more quenching compounds 220 can mix with a stream of the one or more polycarbonate copolymers within the one or more channels 212 and/or reactor loops 214. The one or more quenching compounds 220 can quench the one or more ROPs forming the last block of the subject polycarbonate copolymers, and thereby create one or more salt byproducts. The one or more salt byproducts can thereby serve as catalysts for one or more post-polymerization modifications of the one or more polycarbonate copolymers with the one or more TMSS 222. For example, the one or more post-polymerization modifications can comprise functionalizing the one or more polycarbonate copolymers with one or more third functional groups (e.g., represented by "$R^3$") of the one or more TMSS 222. The one or more ROPs and/or the one or more post-polymerization modifications can each be performed in flow within the one or more flow reactors 202.

FIG. 8 illustrates a diagram of example, non-limiting neutral chemical compounds 704 that can be utilized in one or more ROP of the one or more cyclic carbonate monomers 100 within one or more flow reactors 202 in accordance with one or more embodiments described herein. Repetitive description of like elements employed in other embodiments described herein is omitted for sake of brevity. For example, FIG. 8 depicts four chemical structures that can characterize one or more of the neutral chemical compounds 704.

As shown in FIG. 8, "X" can represent an oxygen atom, a sulfur atom, and/or a nitrogen atom. Also, "D" can represent a carbon atom and/or a nitrogen atom. Wherein "X" and/or "D" is a nitrogen atom and/or a carbon atom, "X" and/or "D" can be bonded to a hydrogen and/or an additional functional group. For example, the additional functional group can comprise an alkyl group and/or an aryl group. Additionally, wherein a chemical structure comprises two "D"s" each respective "D" can be alike or distinct from each other. Additionally, the one or more neutral chemical compounds 704 can comprise the one or more fourth functional groups (e.g., represented by "$R^4$"), the one or more fifth functional groups (e.g., represented by "$R^5$"), the one or more sixth functional groups (e.g., represented by "$R^6$"), and/or the one or more seventh functional groups (e.g., represented by "$R^7$"). The one or more neutral chemical compounds 704 can be subject to one or more proton transfers (e.g., deprotonations) to derive the one or more anionic catalysts 204. Further, as the acidity of the one or more neutral chemical compounds 704 decreases, the catalytic activity of the one or more anionic catalysts 204 derived from the neutral chemical compound 704 can increase.

FIG. 9 illustrates a flow diagram of an example, non-limiting method 900 that can facilitate polymerizing and/or functionalizing one or more chemical compounds (e.g., polycarbonates 208) in accordance with one or more embodiments described herein. Repetitive description of like elements employed in other embodiments described herein is omitted for sake of brevity.

At 902, the method 900 can comprise quenching one or more ROP reactions that can form one or more chemical compounds (e.g., polycarbonates 208). The quenching at 902 can comprise forming one or more salt byproducts. Further, the one or more salt byproducts can act as catalysts for further reactions.

At 904, the method 900 can comprise functionalizing, via a post-polymerization reaction within one or more flow reactors 202, the one or more chemical compounds (e.g., polycarbonate 208) by covalently bonding one or more TMSS 222 to one or more pendent functional groups of the chemical compound (e.g., polycarbonate 208) in the presence of the catalyst. The pendent functional group can comprise one or more perfluoroaryl groups and/or a methylene group.

Further, in one or more embodiments, the one or more chemical compounds can be formed via one or more ROPs within the one or more flow reactors 202. Further, the one or more ROPs can comprise switching an active anionic catalyst 204 from a first anionic catalyst 204 to a second anionic catalyst 204 via a proton transfer with a neutral chemical compound 704. The proton transfer can comprise neutralizing the first anionic catalyst 204 and ionizing the neutral chemical compound 704 to form the second anionic catalyst 204.

FIG. 10 illustrates a flow diagram of an example, non-limiting method 1000 that can facilitate polymerizing and/or functionalizing one or more polycarbonates 208 in accordance with one or more embodiments described herein. Repetitive description of like elements employed in other embodiments described herein is omitted for sake of brevity.

At 1002, the method 1000 can comprise quenching a ROP reaction that can form one or more polycarbonate polymers (e.g., polycarbonates 208). The quenching at 1002 can comprise forming one or more salt byproducts. Further, the one or more salt byproducts can be catalysts for further reactions.

At 1004, the method 1000 can comprise functionalizing the one or more polycarbonate polymers (e.g., polycarbonates 208) by reacting one or more TMSS 222 with the one or more polycarbonate polymers in the presence of the catalyst and within one or more flow reactors 202. The one or more polycarbonate polymers can comprise one or more perfluoroaryl groups.

Further, in one or more embodiments, the one or more polycarbonate polymers can be formed via one or more ROPs within the one or more flow reactors 202. Also, the one or more ROPs can comprise switching an active anionic catalyst 204 from a first anionic catalyst 204 to a second anionic catalyst 204 via a proton transfer with a neutral chemical compound 704. The proton transfer can comprise neutralizing the first anionic catalyst 204 and ionizing the neutral chemical compound 704 to form the second anionic catalyst 204.

FIG. 11 illustrates a flow diagram of an example, non-limiting method 1100 that can facilitate polymerizing and/or functionalizing one or more polycarbonates 208 in accordance with one or more embodiments described herein. Repetitive description of like elements employed in other embodiments described herein is omitted for sake of brevity.

At 1102, the method 1100 can comprise quenching one or more ROP reactions with one or more chemical acids (e.g., quenching compounds 220). The one or more ROP reactions can form one or more polycarbonates 208. Further, the quenching at 1102 can comprise forming one or more salt byproducts.

At 1104, the method 1100 can comprise functionalizing, via one or more post-polymerization reactions within one or more flow reactors 202, the one or more polycarbonates 208. The one or more polycarbonates 208 can comprise one or more perfluoroaryl groups. Also, the one or more salt byproducts can catalyze the functionalizing at 1104.

Moreover, in one or more embodiments, the one or more polycarbonates 208 can be formed via one or more ROPs within the one or more flow reactors 202. Also, the one or more ROPs can comprise switching an active anionic catalyst 204 from a first anionic catalyst 204 to a second anionic catalyst 204 via a proton transfer with a neutral chemical compound 704. The proton transfer can comprise neutralizing the first anionic catalyst 204 and ionizing the neutral chemical compound 704 to form the second anionic catalyst 204.

Figure 12:
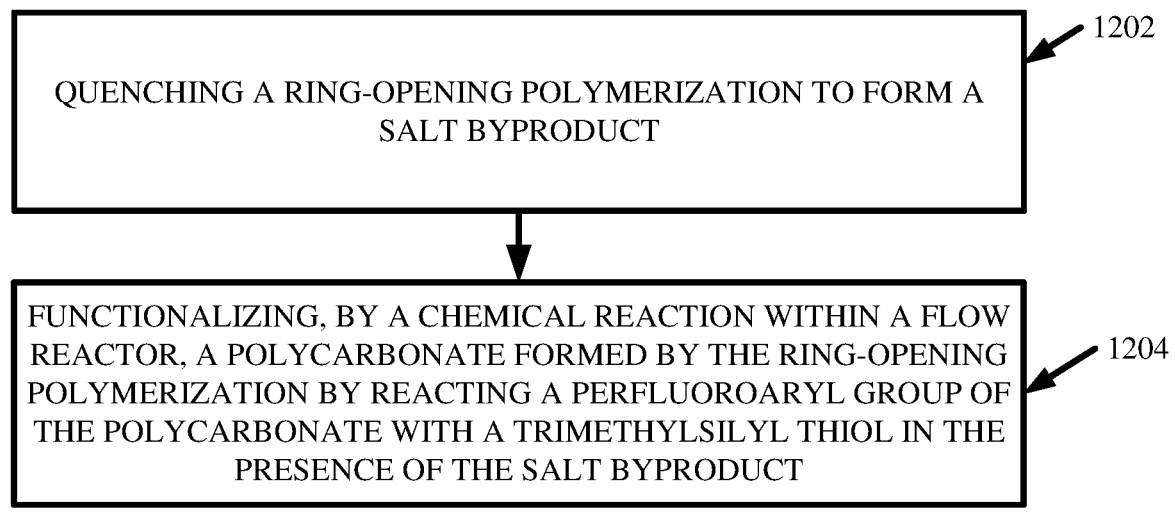
FIG. 12 illustrates a flow diagram of an example, non-limiting method that can facilitate forming a polymer (e.g., a block copolymer) via a one or more ring-opening polymerization within one or more flow reactors, wherein the one or more ring-opening polymerizations can be facilitated by a changing an active catalyst from one anionic catalyst to another anionic catalyst in accordance with one or more embodiments described herein.

FIG. 12 illustrates a flow diagram of an example, non-limiting method 1200 that can facilitate polymerizing and/or functionalizing one or more chemical compounds (e.g., polycarbonates 208) in accordance with one or more embodiments described herein. Repetitive description of like elements employed in other embodiments described herein is omitted for sake of brevity.

At 1202, the method 1200 can comprise quenching one or more ROPs to form one or more salt bioproducts. Further, at 1204, the method 1200 can comprise functionalizing, by a chemical reaction within one or more flow reactors 202, one or more polycarbonates 208 formed by the one or more ROPs by reacting one or more perfluoroaryl groups of the polycarbonate with one or more TMSS 222 in the presence of the salt byproduct. The one or more salt byproducts can catalyze the functionalizing at 1104.

Moreover, in one or more embodiments, the one or more polycarbonates 208 can be formed via the one or more ROPs within the one or more flow reactors 202. Also, the one or more ROPs can comprise switching an active anionic catalyst 204 from a first anionic catalyst 204 to a second anionic catalyst 204 via a proton transfer with a neutral chemical compound 704. The proton transfer can comprise neutralizing the first anionic catalyst 204 and ionizing the neutral chemical compound 704 to form the second anionic catalyst 204.

FIG. 13 illustrates a flow diagram of an example, non-limiting method 1300 that can facilitate polymerizing and/or functionalizing one or more polycarbonates 208 in accordance with one or more embodiments described herein. Repetitive description of like elements employed in other embodiments described herein is omitted for sake of brevity.

At 1302, the method 1300 can comprise switching an active catalyst of a ROP from an anionic organocatalyst (e.g., anionic catalyst 204) to a second anionic organocatalyst (e.g., another anionic catalyst 204) by a proton transfer with a neutral chemical compound 704. The proton transfer can neutralize the anionic organocatalyst and ionize the neutral chemical compound 704.

At 1304, the method 1300 can comprise quenching the ROP. The ROP can form one or more polycarbonate polymers (e.g., polycarbonates 208). Further, at 1306, the method 1300 can comprise modifying the one or more polycarbonate polymers via one or more post-polymerization reactions within one or more flow reactors 202. The one or more post-polymerization reactions can comprise reacting one or more perfluoroaryl groups of the one or more polycarbonate polymers with one or more TMSS 222 in the presence of one or more catalyst. In one or more embodiments, the one or more catalysts can be salt byproducts formed during the quenching at 1304.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   functionalizing, via a post-polymerization reaction within a flow reactor, a chemical compound by covalently bonding a trimethylsilyl protected thiol to a pendent functional group of the chemical compound in a presence of a catalyst, the pendent functional group comprising a perfluoroaryl group and a methylene group.

2. The method of claim 1, wherein the catalyst is a salt byproduct of quenching a polymerization reaction that forms the chemical compound, and wherein the chemical compound is a polycarbonate.

3. The method of claim 1, further comprising:
quenching a ring-opening polymerization reaction that forms the chemical compound, wherein the chemical compound is a polycarbonate, wherein the quenching comprises forming a salt byproduct, and wherein the salt byproduct is the catalyst.

4. The method of claim 3, wherein the ring-opening polymerization reaction is performed within the flow reactor and comprises polymerizing a cyclic carbonate monomer in the presence of an anionic organocatalyst.

5. The method of claim 4, wherein the ring-opening polymerization reaction further comprises switching an active catalyst from the anionic organocatalyst to a second anionic organocatalyst by a proton transfer with a neutral chemical compound, wherein the proton transfer neutralizes the anionic organocatalyst and ionizes the neutral chemical compound.

6. A method, comprising:
functionalizing a polycarbonate polymer by reacting a trimethylsilyl protected thiol with the polycarbonate polymer in the presence of a catalyst and within a flow reactor, wherein the polycarbonate polymer comprises a perfluoroaryl group.

7. The method of claim 6, wherein the perfluoroaryl group is bonded to the polycarbonate polymer via a methylene group.

8. The method of claim 6, further comprising:
quenching a ring-opening polymerization reaction that forms the polycarbonate polymer, wherein the quenching comprises forming a salt byproduct, and wherein the salt byproduct is the catalyst.

9. The method of claim 8, wherein the ring-opening polymerization reaction is performed within the flow reactor and comprises polymerizing a cyclic carbonate monomer in the presence of an anionic organocatalyst.

10. The method of claim 9, wherein the ring-opening polymerization reaction further comprises switching an active catalyst from the anionic organocatalyst to a second anionic organocatalyst by a proton transfer with a neutral chemical compound, wherein the proton transfer neutralizes the anionic organocatalyst and ionizes the neutral chemical compound.

11. A method, comprising:
quenching a ring-opening polymerization reaction with a chemical acid, wherein the ring-opening polymerization reaction forms a polycarbonate, and wherein the quenching comprises forming a salt byproduct; and
functionalizing, via a post-polymerization reaction within a flow reactor, the polycarbonate, wherein the polycarbonate comprises a perfluoroaryl group, and wherein the salt byproduct catalyzes the functionalizing.

12. The method of claim 11, wherein the perfluoroaryl group is bonded to the polycarbonate via a methylene group.

13. The method of claim 11, wherein the salt byproduct is a basic salt.

14. The method of claim 11, wherein the ring-opening polymerization reaction is performed within the flow reactor and comprises polymerizing a cyclic carbonate monomer in the presence of an anionic organocatalyst.

15. The method of claim 14, wherein the ring-opening polymerization reaction further comprises switching an active catalyst from the anionic organocatalyst to a second anionic organocatalyst by a proton transfer with a neutral chemical compound, wherein the proton transfer neutralizes the anionic organocatalyst and ionizes the neutral chemical compound.

16. A method, comprising:
quenching a ring-opening polymerization to form a salt byproduct; and
functionalizing, by a chemical reaction within a flow reactor, a polycarbonate formed by the ring-opening polymerization by reacting a perfluoroaryl group of the polycarbonate with a trimethylsilyl protected thiol in the presence of the salt byproduct.

17. The method of claim 16, wherein the salt byproduct is a catalyst to the functionalizing.

18. The method of claim 17, wherein the quenching is performed within the flow reactor.

19. The method of claim 18, wherein the ring-opening polymerization comprises polymerizing a cyclic carbonate monomer in the presence of an anionic organocatalyst.

20. The method of claim 19, wherein the ring-opening polymerization further comprises switching an active catalyst from the anionic organocatalyst to a second anionic organocatalyst by a proton transfer with a neutral chemical compound, wherein the proton transfer neutralizes the anionic organocatalyst and ionizes the neutral chemical compound.

21. A method comprising:
modifying a polycarbonate polymer via a post-polymerization reaction within a flow reactor, wherein the post-polymerization reaction comprises reacting a perfluoroaryl group of the polycarbonate polymer with a trimethylsilyl protected thiol in the presence of a catalyst.

22. The method of claim 21, wherein the catalyst is a salt byproduct of a quenching of a ring-opening polymerization that formed the polycarbonate polymer.

23. The method of claim 22, wherein the perfluoroaryl group is bonded to a molecular backbone of the polycarbonate polymer via a methylene group.

24. The method of claim 22, wherein the ring-opening polymerization is performed within the flow reactor and comprises polymerizing a cyclic carbonate monomer in the presence of an anionic organocatalyst.

25. The method of claim 24, wherein the ring-opening polymerization further comprises switching an active catalyst from the anionic organocatalyst to a second anionic organocatalyst by a proton transfer with a neutral chemical compound, wherein the proton transfer neutralizes the anionic organocatalyst and ionizes the neutral chemical compound.

* * * * *